United States Patent [19]
Shaw et al.

[11] Patent Number: 5,870,553
[45] Date of Patent: Feb. 9, 1999

[54] SYSTEM AND METHOD FOR ON-DEMAND VIDEO SERVING FROM MAGNETIC TAPE USING DISK LEADER FILES

[75] Inventors: Wade David Shaw, Austin, Tex.; Daniel Charles Wolfe, Tucson, Ariz.

[73] Assignee: International Business Machines Corporation, Armonk, N.Y.

[21] Appl. No.: 716,082

[22] Filed: Sep. 19, 1996

[51] Int. Cl.⁶ ................................. H04N 7/10
[52] U.S. Cl. ................. 395/200.49; 348/7; 348/12; 455/5.1
[58] Field of Search .................. 348/7, 12, 13; 455/4.2, 5.2; 395/200.4, 200.48, 200.49

[56] References Cited

U.S. PATENT DOCUMENTS

| | | | |
|---|---|---|---|
| 4,584,616 | 4/1986 | Allen | 348/7 |
| 5,414,455 | 5/1995 | Hooper et al. | |
| 5,421,031 | 5/1995 | De Bey | |
| 5,434,678 | 7/1995 | Abecassis | |
| 5,442,390 | 8/1995 | Hooper et al. | |
| 5,539,660 | 7/1996 | Blair et al. | 348/7 |
| 5,544,313 | 8/1996 | Schachnai et al. | 348/7 |
| 5,550,577 | 8/1996 | Verbiest et al. | 455/5.1 |
| 5,586,264 | 12/1996 | Belknap et al. | 348/7 |
| 5,603,058 | 2/1997 | Belknap et al. | 395/855 |
| 5,606,359 | 2/1997 | Youden et al. | 348/7 |
| 5,608,448 | 3/1997 | Smoral et al. | 348/7 |
| 5,652,916 | 7/1997 | Murakami et al. | 348/7 |
| 5,701,582 | 12/1997 | De Bey | 455/4.2 |
| 5,712,976 | 1/1998 | Falcon, Jr. et al. | 395/200.09 |

*Primary Examiner*—Nathan Flynn
*Attorney, Agent, or Firm*—Robert M. Carwell

[57] ABSTRACT

A system and method for delivering cost-reduced, low latency, wider variety video-on-demand for digitized motion pictures. Leader files stored in disk array are accessible quickly for viewing in response to the user's selection, thereby providing low latency time from the initial request to the viewing of the leader. The remainder of the digitized movie files are stored in a robotic tape library archive system having greater access time than disk array storage but at significantly reduced storage cost. During the viewing of the leader from the rapidly accessible disk array, the remainder of a selection is accessed at a slower rate on tape and transferred to disk for viewing seamlessly at conclusion of the leader. The hybrid rapidly accessible disk storage of leader and cost effective bulk storage on tape of the remainder of selections provides both low latency and significant storage cost reduction, thereby increasing the number of video selections which may be offered.

42 Claims, 8 Drawing Sheets

SYSTEM AND METHOD FOR ON-DEMAND VIDEO SERVING FROM MAGNETIC TAPE USING DISK LEADER FILES

TECHNICAL FIELD

The invention relates to on-demand video viewing systems and methods and, more particularly, relates to such systems and methods employing video archiving and data pump servers.

BACKGROUND OF THE INVENTION

"Video-on-demand" (VOD) viewing is a method for allowing consumers to select and view an arbitrary video file such as a motion picture at any time from a large number of choices supplied by a service provider. One of the many factors critical to the success of such a VOD consumer service is "latency", e.g., the time which passes from the moment the customers make the initial title selection to when the video is actually available for viewing. Generally it has been found that nominally a delay on the order of 60 seconds from time of selection to actual commencement of display of the image is acceptable. Yet another critical factor in the success of such services is whether the service provider can offer a large quantity and variety of choices in content to their customers.

In accordance with present day techniques, on-demand display of motion picture data has generally been effected by storage of the associated digitized video files on magnetic disks. The storage requirements for such an approach however, can become enormous. A typical full length motion picture may average perhaps 110 minutes of video data. Assuming a representative conventional and well-known video compression format such as MPEG2 at a nominal data rate of 3 megabits per second, even a single motion picture will require approximately 2 gigabytes of disk storage. Thus, it is readily apparent that storage of large numbers of motion picture data files on disk may not be cost effective but nevertheless necessary in order to satisfy the first mentioned consumer criteria of a low latency access time on the order of seconds. Unfortunately then, one of the major cost components of a commercially acceptable VOD server is simply the disk storage required to store the aforementioned MPEG2 or other data files for all of the selections that the service provider wishes to offer.

Illustrated schematically in FIG. 1A is one simplified approach to VOD systems. In this system, a plurality of disk storage devices 24 are provided having stored thereupon the desired content which, in the case under consideration, is a variety of desired full-length digitized motion pictures. In response to a user selection of a particular desired title, the file is read off the disk storage 24 into an appropriate video server 2, which then delivers the image of the film on the display 3 to the end user. This system successfully addresses the aforementioned latency problem inasmuch as the disk storage has a relatively fast access time, e.g., it is sufficiently responsive to the user's selection so as to mount and begin displaying the desired selection after perhaps one or two seconds after receipt of the user's choice. However, as pointed out, disk storage, although having the advantage of fast access time, unfortunately also suffers from the concomitant attribute of being quite expensive relative to other known mass storage devices. Thus such systems have enjoyed little success.

In recognition of this fact, illustrated in FIG. 1B is yet another schematic of an alternative VOD system which addresses the drawbacks of the system of FIG. 1A. Essentially the technique employed as illustrated in FIG. 1B for reducing the cost of on-line disk storage of the video data is to simply use a less expensive storage media such as magnetic tape storage 4. Thus, a plurality of magnetic tape carrousels may be provided, having associated therewith a corresponding plurality of video titles stored on such magnetic tape. In response to user input specifying a desired title to be viewed, the carousel operates to mount the particular tape containing the desired video image file on an appropriate tape drive 5. The tape drive then reads the tape and generates a video data stream viewable at the appropriate display device 3.

A characteristic of such magnetic tape storage and associated carrousels and players is that they are substantially less expensive than the disk storage and drive approach shown in FIG. 1A. However, as should be readily apparent given the nature of tape drives, using such a tape media to store the video data increases the undesirable latency between the user selection and the availability of the motion picture for viewing. such delay is not always an acceptable alternative, particularly in a commercial setting. This increased latency in the magnetic tape approach is due to the time required for an automated tape library to load the tape from the carousel, to locate the beginning of the video data file, and to move the data from tape to disk 1 if playback will not be directly from the tape drive 5.

On the latter point, in addition to the possibility of moving the entire data file from tape 4 to disk 1 prior to viewing (if the tape data rate exceeds that of the viewing data rate), such prior systems alternatively provided for viewing the video data directly from the tape storage. In either event, however, the aforementioned latency problem was nevertheless still present, as well as the need for providing dedicated tape drive units for the duration of the viewing time for each viewer.

Thus, in summary, the problem of providing demand video viewing from digitized motion picture has been solved by 3 basic approaches. First, all such data in some systems has been stored entirely on magnetic disk, giving rise to prohibitive cost constraints. Secondly, still other systems have at least saved some cost in magnetic disk by providing selected and less frequently requested movie selections on tape. However, this requires the viewer to wait for video data to be restored from tape before viewing, thereby contributing to the undesirable latency problem previously described. Finally, still other systems have provided for cost savings by storing movie data on tape and further providing for viewing of the movie data directly from such tape. This proposed solution has also been proven to not be cost effective inasmuch as it requires a tape drive to be available for each end user or viewer.

SUMMARY OF THE INVENTION

A video-on-demand system and method is provided combining the advantage of low cost tape storage and low latency capabilities of disk storage. First portions of corresponding motion picture data files are stored on magnetic disk storage as leader files. When a consumer makes a selection of a motion picture which is desired to be viewed, the viewing of the selection may start almost immediately from the corresponding leader file stored on disk. The leader file stores a sufficient amount of data to provide enough time, while it is playing, to enable the tape library to mount, locate, and transfer the remaining motion picture data of the selection from tape to disk. The disk data is appended to the leader file, and play of the video occurs seamlessly beyond the leader file through the remainder to completion of the selection.

In one aspect of the invention, a tape resource reservation is made at time of selection. When the consumer selects the video title desired to be viewed, a video control server queries a video tape archive server in order to make a reservation for a tape drive and robot load. The archive server maintains a queue of requests for restores from tape. For each such restore request, the tape file size is known as is the approximate load time from tape. Based upon the number of tape drives in the system, an estimate is then made as to whether the data may be restored in sufficient time before the leader file data is exhausted by the viewer. The video tape archive server responds with an estimated time to load the data, based upon the requests currently in its queue. Should the committed load time exceed that of the leader file play time, the consumer is notified that the title cannot be viewed immediately, and an estimate is provided of the time at which the desired selection will be available for viewing.

In addition to reservation of tape library resources, a bandwidth reservation is provided for the disk file system and disk drive interconnect bus to ensure that the data transfer from tape to disk can occur at a high rate that the tape drive is capable of. In order to avoid additional locate time overhead when reviewing file data from the tape drive to locate the leader-remainder boundary, the leader portion of the motion picture file is preferably stored separately from the remainder portion of the file. This results in improved locate time, since the beginning remainder of a tape file can thereby be located quickly, and seeking to a byte offset within an entire file including the leader is thereby avoided.

In summary, the invention provides a system and method whereby just enough disk storage is utilized to cover the time required to load, locate, and transfer tape file data stored in a tape or other like media less expensive than the disk storage. The viewer may then begin viewing a selection without delay by viewing data associated with the leader generated from the disk storage, followed by the remainder of the video file being delivered from the tape file system, thereby resulting in a significantly cost-reduced system which at the same time has reduced latency characteristics.

DETAILED DESCRIPTION OF THE PREFERRED EMBODIMENT

Figure 1A:
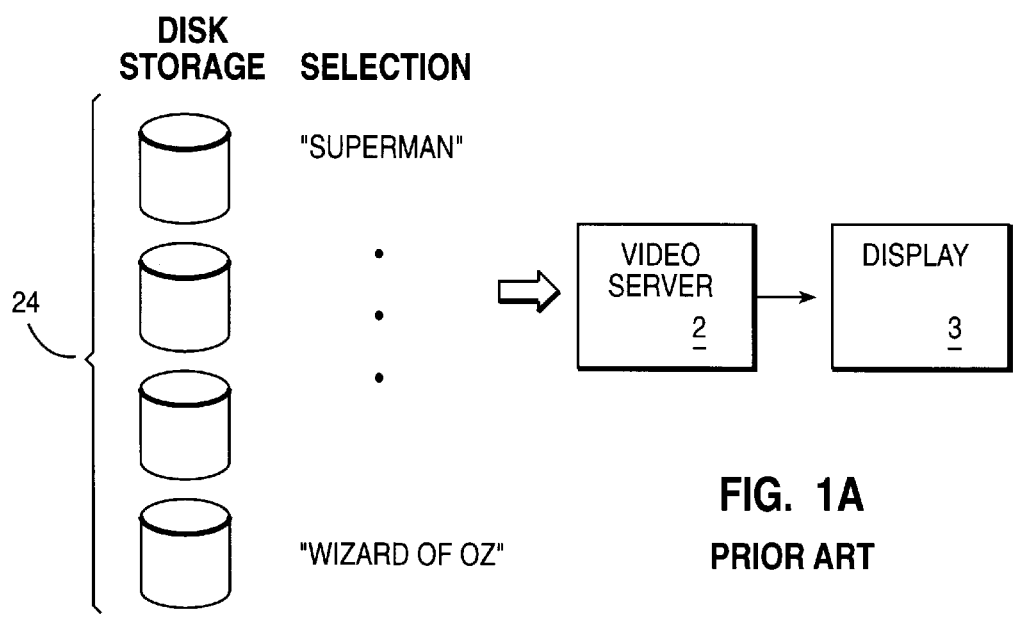
FIG. 1A is a simplified pictorial illustration of one form of video-on-demand service known in the prior art.
Figure 1B:
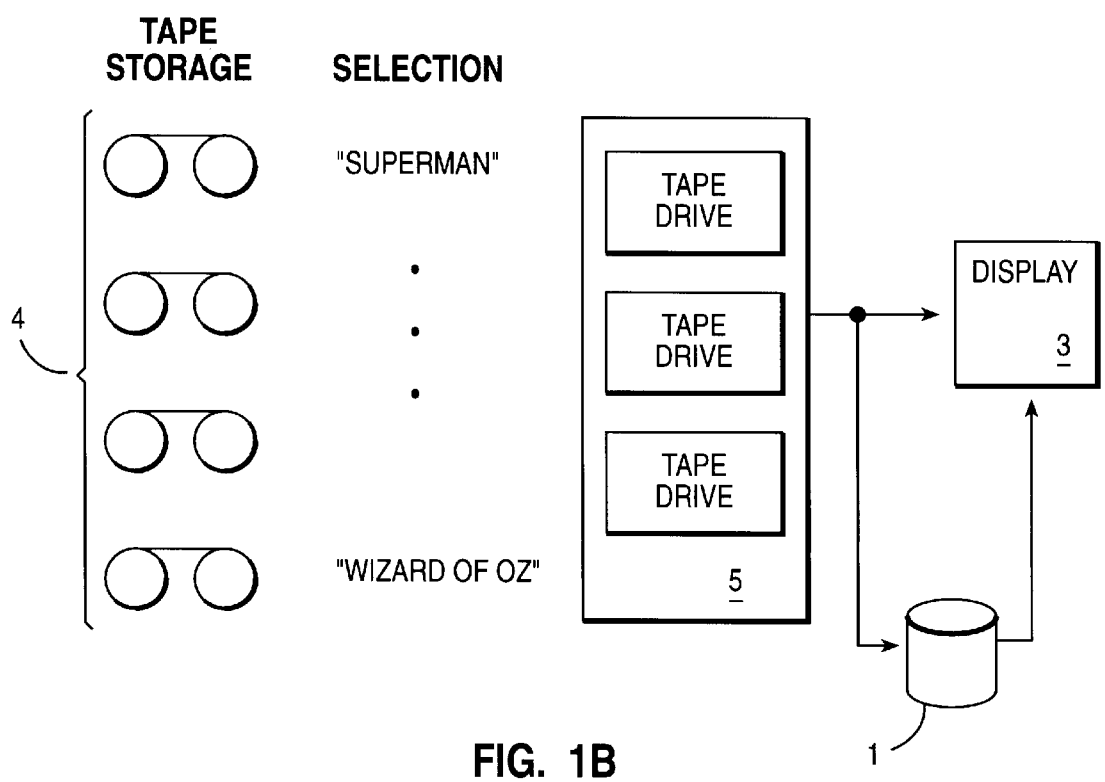
FIG. 1B is a simplified pictorial illustration of another form of video-on-demand service known in the prior art.
Figure 2:
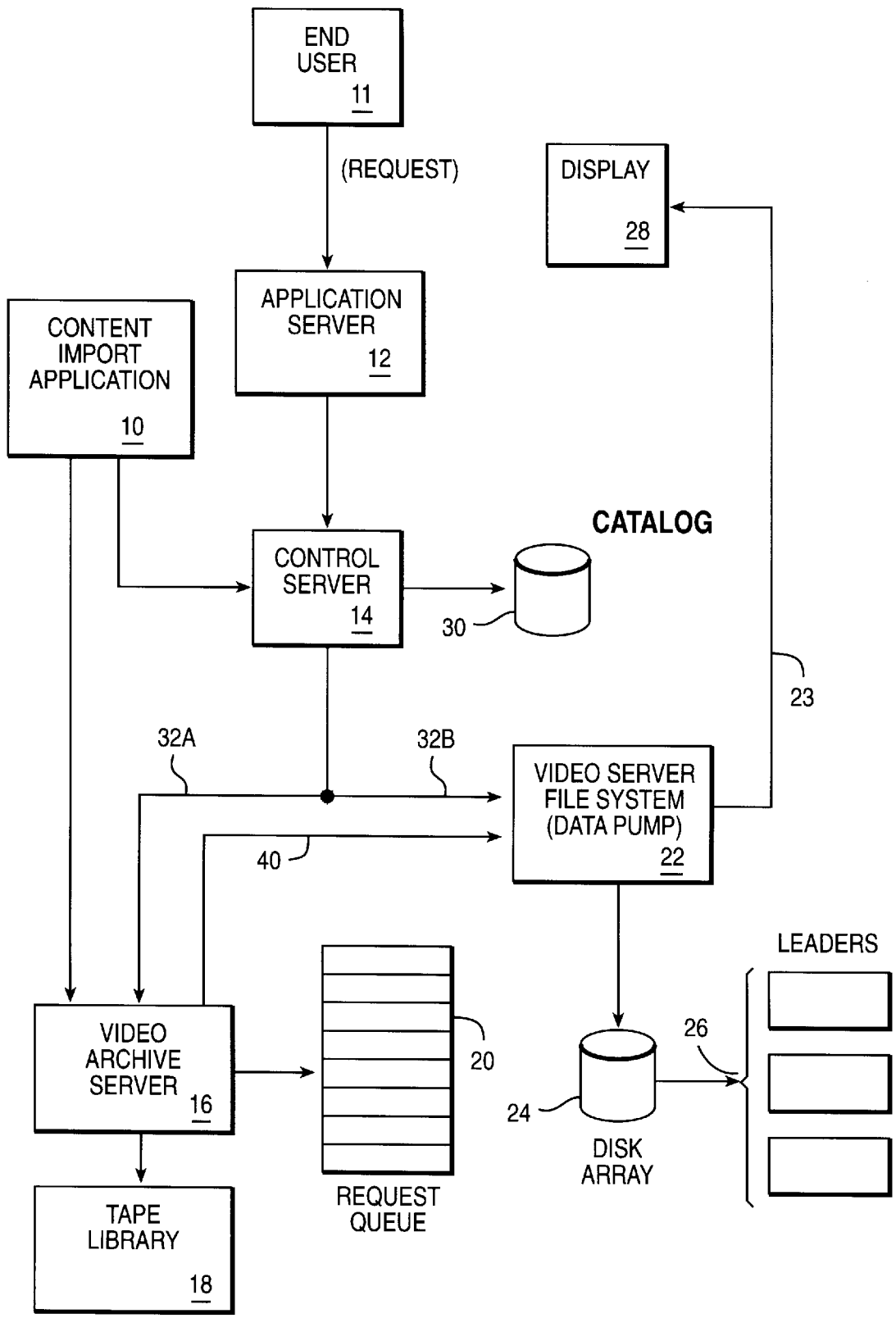
FIG. 2 is a block diagram illustrating a representative embodiment of the video-on-demand system of the invention.

FIG. 2 is a functional block diagram illustrating the main components of a representative embodiment of the invention. The operation of the invention will be described generally with reference to this figure and by a description of a flow diagram of FIGS. 5A–5B which may be implemented in program code executing on and used in conjunction with the system of FIG. 2. First an end user, 11, through an appropriate computer terminal associated with the system of FIG. 2, conveys a desired video selection request to an application server 12. The application server 12 then issues a request to a controller server 14, which is a component of the video complex of FIG. 2. The control server contains and manages a catalog or directory 30 of all of the video assets which the system is capable of serving. This catalog will include data indicating which video title of the assets are on line and which are not, e.g., which titles are completely stored in a storage such as the disk array 24, and which are available only on the tape library 18, and which have "leaders" 26 to be herein described in the disk array 24.

The control server 14, after examining the catalog 30 for the desired video selection, may determine that the desired selection is partially on the video server file system 22, whereas the remainder of the selection or file is stored on tape. This situation will typically arise for title selections that are less frequently viewed and are thus archived (rather than being stored more conveniently but also unfortunately more expensively on media such as video disk 24.

Continuing with FIG. 2, the video server file system 22 embodies the actual subsystems, including code and disk array storage 24, which actually display the video to the end user 11, such as on a display terminal 28. The disk array or other suitable storage 24 may contain the complete video file of selections as well as only "leader" files 26 as desired. The archive catalog 30 serviced by the control server 14 will contain information indicating for a video selection whether such a corresponding file has been completely stored in the mass storage 24 or is stored on the tape library 18, and whether corresponding leaders 26 is available.

Once the control server 14, in response to a query to the catalog 30, determines that a portion (e.g., the remainder) of the desired video file has in fact been stored on the less expensive tape media, the control server 14 then issues a request for data from the tape library 18 to reserve necessary resource for servicing the request and to determine the estimated latency in order to provide the data from tape. This control signal is seen in FIG. 2 at reference numeral 32A from the control server to the video archive server 16. The video archive subsystem 16 will determine what queued requests are already in progress at the tape library 18 by querying a request queue 20 maintained by the video archive server 16. The video archive 16 can determine as a result of the request queue 20, what requests for tape in the tape library 18 have already been made and further will estimate the length of time required to transfer each file associated with a request to video server file system 22 in order to deliver the associated video file imagery to the end user 11.

The tape library 18 per se, may include a carousel or the like containing the physical tape media and the associated tape transport and drive mechanisms for causing a tape (selected as a result of the request from the end user 11) to be queued in the tape drive to commence delivering the video file as requested by the video archive server 16. The video archive server 16, by utilizing the request queue 20, may determine how long it will take to load the tape and start transferring data off the tape in the library 18. This information is returned back to the control server 14 on line 32A. The control server 14 then does a comparison of the estimated delay time before video image data may be delivered by the tape library 18 through the video archive 16 and the "drop dead time", e.g., the time it takes to view a leader file 26 corresponding to the user-specified video selection in the tape library.

It will be recalled that the function of the leader 26 is to provide essentially instantaneous access to at least a portion of the corresponding selected video file, e.g., the "Leader". The playback of the leader is essentially to gain time during this delay time to permit the mechanical tape subsystem to mount the tape and append the "remainder" file to the "leader" file on disk. Upon completion of the leader playback, the playback will continue with the remainder portion that was transferred from tape library 18 to disk 24.

If the delay time thereby calculated by the control server 14 from the estimates of the video archive server 16 is longer than the drop-dead time, the entire video selection cannot smoothly and seamlessly be viewed. This is because there will be a gap between completion of the corresponding video leader 26 and when the subsequent portion of the video file is made available for viewing by transferring data from the tape library 18 to disk 24.

If, on the other hand, the drop dead time is greater than the time estimated for delivery of the remainder of the video file by the video archive/tape library system, this indicates that the archive/library system is not loaded excessively by other requests. Thus, in this instance the control server 14 will have determined that the video selection is viewable without interruption by employing the combination of the leader 26 and the remainder of the video selection in the tape library 18. In such an instance, the video server file system 22 will permit the viewing almost immediately of the corresponding leader 26 stored on the array 24 which will be delivered on line 23 to the user's display monitor 28. Also essentially simultaneously, the request which is placed in queue 20 associated with the video archive server 16. This will cause the video archive server to transfer the data in the tape library associated with this selection's remainder across line 40 to the video server file system 40 to the video server file system 22 as soon as it begins becoming available from a tape library 18. The content import application 10 may be essentially any PC or other box.

Now that an overall description of the operation of the invention has been provided with reference to FIG. 2, details will be provided of additional real world and hardware considerations in implementing the system.

First, requirements for the application server 12 are relatively undemanding inasmuch as the purpose of this server is merely to serve as an interface between the end user 11 and a control server 14. Thus, a terminal, personal computer or low-end RISC-based machine could serve quite adequately. The control server 14 in a representative embodiment, as with the application server 12, does not require a considerable amount of processing power inasmuch as its main function is merely to query the video data catalog 30, and to control the video archive server 16 and the video server file system 22. Thus, a model R20 or model 39H RISC-based computer from the RS/6000 (™) line of Unix based servers manufactured and distributed by the IBM Corporation would serve quite adequately for this purpose. In like manner, the video archive server 16 may take the form of such a model R20 machine or a similar machine of even lesser capability. The video server file system, 22, desirably will take the form of a high performance disk subsystem such as the IBM 7133 using SSA bus connectivity, with a multimedia file system.

The tape library subsystem 18 in conjunction with the video archive server 16 might also preferably take the form of an IBM model 3494 computer including a model 3590 Magstar (™) tape drive. Alternatively, the storage media for the various video files comprising the tape library 18 might also be in the form of optical disks, digital video disks, digital linear technology (DLT) media, or other forms of tape drive well known in the art. As to the storage device suitable for storing the video leaders 26 shown at reference numeral 24, it will be noted that in a preferred embodiment this storage device may be a Raid 5 disk array which is well suited to data loss protection. However, as will be readily apparent to any routineer in the art, the invention admits to substitution essentially of many other forms of disk or other storage. Thus these disk drive arrays could alternatively be SCSI, IDE, or for example, disk drive sets of nominally two to four gigabytes capacity running the serial storage protocol (SSA).

As to the data path or bus 40 for carrying the archived video data from the video archive server 16 to the video server (data pump) 22, such a path may take the form of an ATM link which desirably has very good characteristics in terms of large bandwidth and reduced CPU loading or overhead on the video server 22. However, the invention is not intended to be so limited and admits to employing FDI links for example, having also a characteristic high bandwidth capability but more CPU utilization. The link 40 may also take the form of an Ethernet link. Essentially any relatively high speed bus preferably running a lossless transmission protocol may be adapted to the invention and even a lossy protocol may be used if the end user application will find lesser quality video acceptable, given the particular application. As to the display 28, although this may take the form of a conventional television displaying video data, it could also be comprised of a computer, for example, with appropriate digital video MPEG decoding. However, it should be readily apparent that in an even more broad sense, the resulting video signal on line 23 may be in any of a number of analog or digital forms without departing from the spirit or scope of the invention and need not therefore necessarily be converted to a viewable form.

A representative illustration of some real world parameters may assist in communicating the nature of a representative embodiment of the invention and the benefits attendant thereto. In one application, it may be desired to provide to an end user 11, a wide variety of choices of video movies on demand, some of which may be called for less frequently than others and thus relegated to the less expensive video archive have been 16 tape format. A relatively typically such movie might have a run time of perhaps 110 minutes. Assuming a video data view rate for good quality at nominally 3 megabits per second, this would result in a movie video file size of somewhere on the order of 2½ gigabytes. It also may assumed that the data transfer rate on the ATM bus 40 transferring archived data of the movie from the video archive server 16 to the video server file system 22 would be on the order of 9 megabytes per second. Thus, given a movie video size for essentially the entirety of the movie at 2.5 gigabytes at a transfer rate of 9 megabytes per second, it will be apparent that transfer of the movie data from the archive server 16 to the video server 22 would, in the example under consideration, require approximately 5 minutes, e.g., transfer time=(2.5 gigabytes/sec)/(9 megabytes/sec)=277 seconds (5 minutes approx.).

Thus a leader file 26 somewhere on the order of 5 minutes in length would be required in order that the end user 11 could view this 5 minutes or so of leader while the balance of the movie data was being transferred from the video archive server 16 to the video server 22.

Also, assuming the previously described nominal view rate of 3 megabits per second for a 5 minute leader, this would translate to a video file size on the disk 24 for the leader of approximately 100 megabytes, e.g., 3 megabits\sec×300 sec=375 kilobytes\sec×300 sec=100 megabyte leader.

From the foregoing illustrative numbers, a nominal compression ratio may thereby be derived, given by 100 megabytes (leader file size) 12.5 gigabytes (movie archive size) =24:1.

In short, if the entirety of the movie was stored on the more expensive disk array 24 media, for video on demand with almost instantaneous latency, a disk space of 2.5 gigabytes would be necessary. However, by only requiring storage of the leader on the disk array (which is a substantially smaller size of 100 megabytes), this will provide enough time (5 minutes) while the user is viewing this 100 megabyte portion of the film for transfer of the entirety of the movie data essentially from the archive 16 to the video server file system 22 and disk array 24. It will thus be readily apparent that the invention provides for a substantial cost savings by reducing the required size of the expensive and fast access time disk array 24 by a factor of 23/24.

Figure 3:
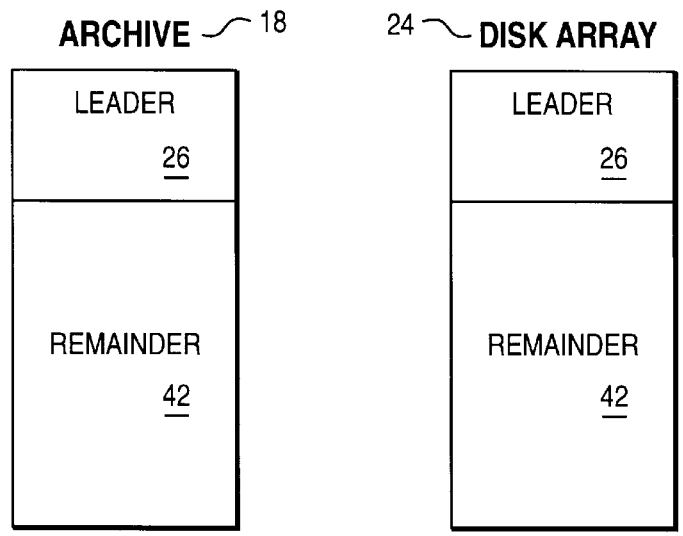
FIG. 3 is an illustration of a preferred technique for storing the leader and the remainder of the video file.
Figure 4:
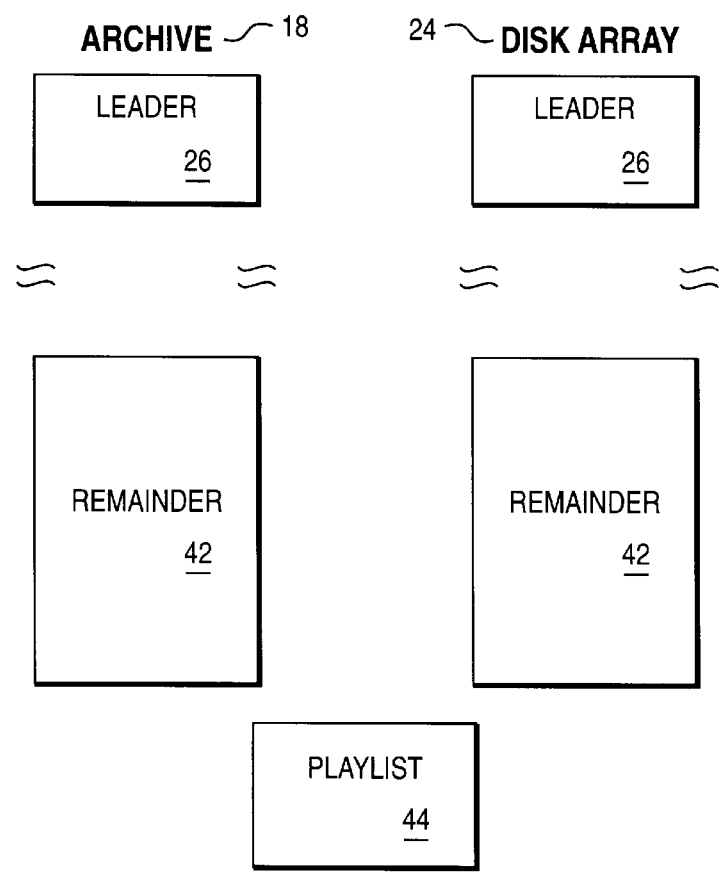
FIG. 4 is an illustration of an alternate technique for storing the leader and remainder of the video file.

Turning now to FIGS. 3 and 4, a comparison therebetween in conjunction with the following description will make it apparent that the invention lends itself to various strategies and techniques appropriate to different circumstances for storing the archived remainder and leader data.

Turning first to case 1 shown in FIG. 3, which is a preferred embodiment, the entirety of the video file including the leader 26 and the remainder 42 will preferably be stored in the tape library 18. The leader 26 may thereafter be stored in the disk array 24. Still later, when the remainder 42 of the video data is required, the entirety of the video file comprising the leader 26 and remainder 42 may be transferred over the link 40, whereupon the leader 26 is ignored or, in the alternative (inasmuch as the leader 26 will already be resident in the disk array) only the remainder 42 may be transferred over the data link 40. In either event, however, inasmuch as the leader 26 is stored in the tape library 18 as a file with the remainder 42, this storage method requires a seek in the leader/remainder file for the beginning of the remainder 42 portion because the leader and remainder are stored as one file. However, this normally would not be a significant drawback or limitation in that seek times to locate the beginning of the remainder file after the approximate 100 megabyte leader would essentially be negligible.

Turning to an alternate strategy for storing the leader and remainder shown in FIG. 4, in this embodiment, the leader 26 and remainder 42 may be stored as separate files in the tape library 18. During initial setup, the leader file 26 would be copied over the data path 40 from the video archive 16 to the video server file system 22 after the request is processed. A playlist 44 will also be generated correlating every leader file to its corresponding remainder file 42 in the tape library 18. When a leader file 26 playback is commenced, the system will query the playlist 44 which will indicate that for a given leader file (such as file 26 in the illustration) there will be a corresponding remainder file (42) which must be played at the end of the leader file 26. Accordingly, after the system determines the correct remainder file 42 in the archived tape library 18 which must be played, the system will transfer this remainder file 42 over the data path 40 while the leader file 26 is being played and viewed by the end user 11. The benefit to such a system is that the need for a seek for the beginning of the remainder file 42 in the file of FIG. 3 comprised of the leader 26 and remainder 42 is thereby obviated. However, this is traded off by the fact that a playlist 44 is thereby necessitated, otherwise not required in the system of FIG. 3.

In summary, from the foregoing, it should be apparent that the invention affords the benefit of significantly reduced system cost while providing great variety of video content for the same allocated storage space (on the order of 24 times more variety of available titles in the illustration).

The various bandwidths of differing components and subsystems may of course affect the overall design and cost savings. These include the bandwidth of the tape loading and playback system, e.g., video archive server 16 and associated tape library subsystem 18, the bandwidth of the data path 40, video system file server 22, and drives 24. Obviously, the larger the bandwidth of the data path 40 and the more delays associated with getting blocks off the tape drive subsystem and the more need there is for randomly accessed rarely viewed titles, the more attractive the system of the invention becomes. The invention assumes availability of relatively rapid access but expensive storage media 24 and a slower access time but less expensive bulk storage media 18. However, the invention is not intended to be limited to particular types of storage and computers, is not intended to be limited only to digital video being provided on the output line 23 and further admits to concurrent streams of multiple movies or other video files being retrieved from the archive and placed on the data path 40.

Still further, the invention contemplates that in some instances there may be no need for the entire video file, whether it be a movie or the like to be delivered to the data pump 22 before the viewing of the leader 26 is completed. In other words, in an alternative embodiment, the video archive server 16 could stop loading blocks from one file in the tape library 18 and commence loading blocks from yet another file associated with a different leader 26, and then go back to servicing the first file. This of course may require unloading of loading of tapes and timesharing in the tape drive subsystem 18.

As previously noted, the tape library 18 may also take the form of a cheaper disk of some sort for archival purposes. Additionally, there may be instances in which a gap is permitted temporally between the completion of the leader 26 and commencement of the remainder file resident in the tape library 18 without departing from the invention's teachings. Also, although the description provided has been with respect to a video on demand player, the invention is not intended to be so limited to video data, but admits to applications for example of audio or even karaoke data or other real time or streaming digital data.

Figure 5A:
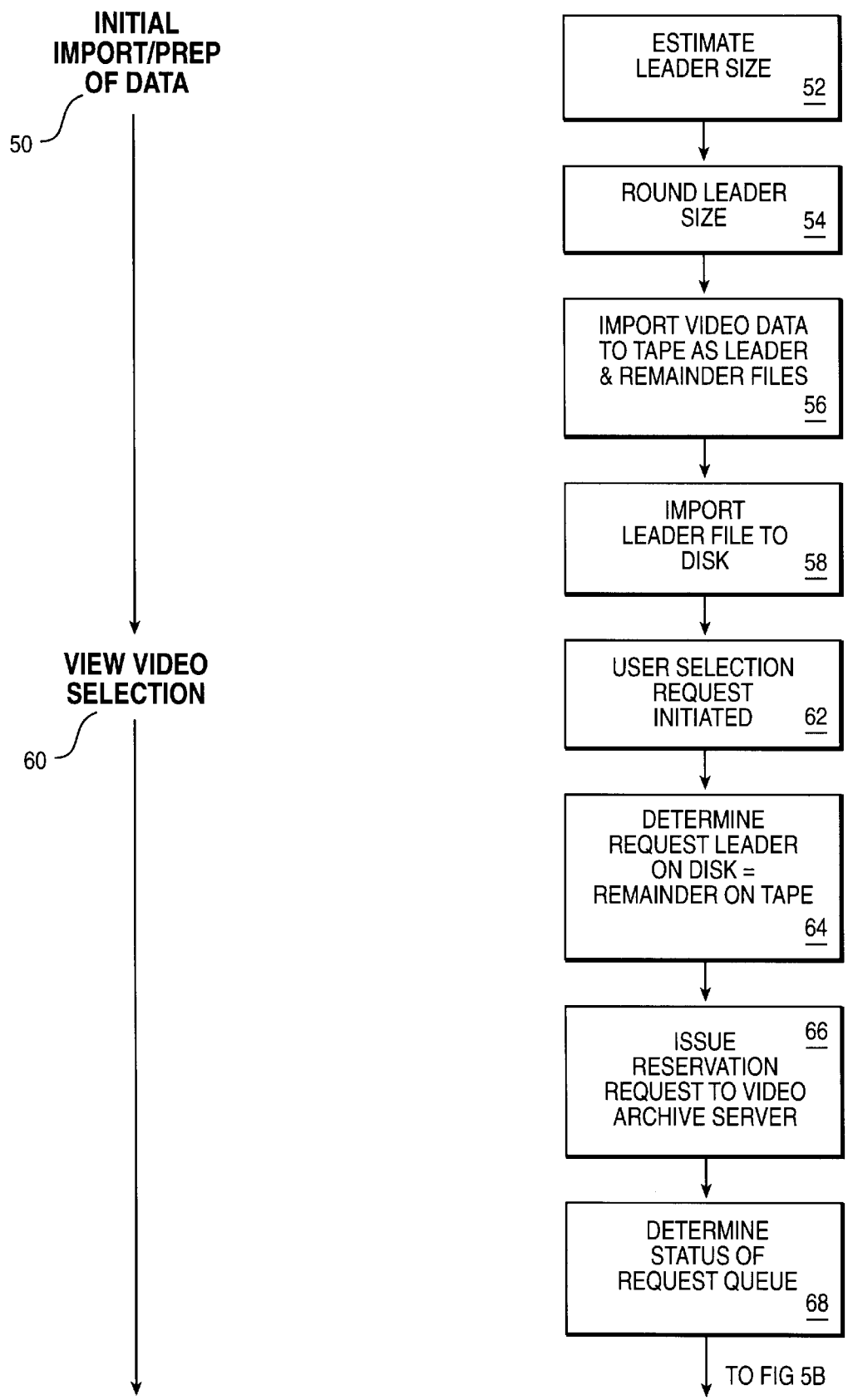
FIGS. 5A and 5B are flow diagrams which may be implemented in appropriate program code for operating the system of FIG. 2 so as to initially import and prepare video data for video-on-demand serving viewing the user-selected video selection and, performing post viewing processing.
Figure 5B:
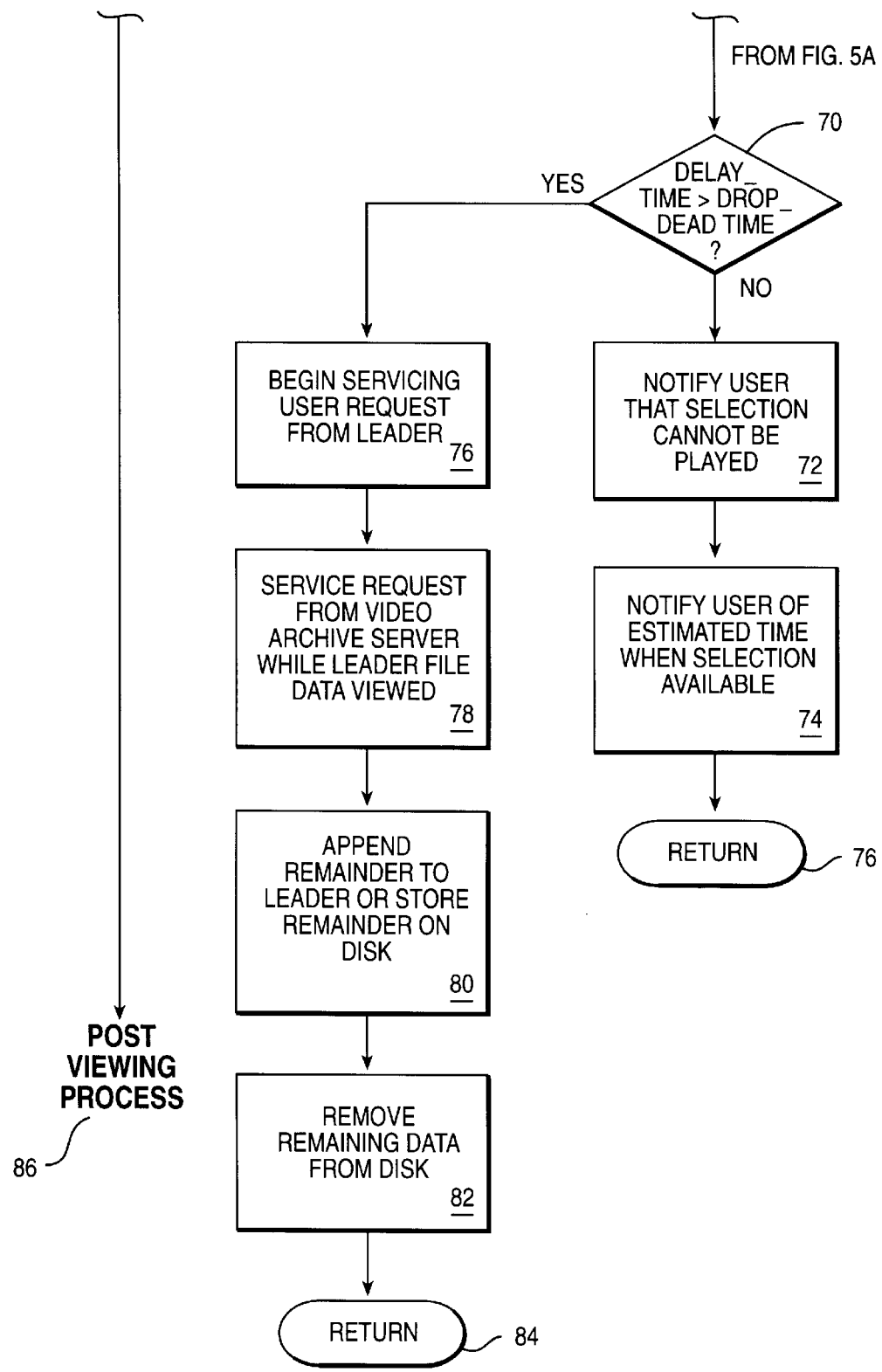

Turning now to FIGS. 5A–5B, depicted therein is a logical flow diagram for program code implemented and intended to execute on the system of FIG. 2 in order to carry out the invention. A brief inspection of FIGS. 5A–5B will reveal that the process depicted therein may be broken down into three general areas, namely the steps associated with initial import and preparation of the video data, 50, the steps associated with actual effecting of the viewing of the video selection, 60, and finally a post viewing processing phase, 86.

Beginning with the initial import/preparation of data, 50, first an estimate is made of the required size of the leader file, 52. In pseudo code these steps associated with effecting this estimate may be carried as shown in the following steps:

```
Raw_Leader_File_Size  =  (Max_Mount_Time +
                          Max_Locate_Time) *
                          Viewing_Rate * Uplift_Factor)
where:
Raw_Leader_File_Size  =  estimated size of leader file before
                          adjusting to disk block size.
Max_Mount_Time        =  Maximum time required to
                          mount a tape cartridge
                          (including time required to remove
                          an already resident cartridge)
Max_Locate_Time       =  Maximum time required to locate
                          a file on tape.
Uplift_Factor         =  Uplift provided to leader file
                          size account for other variations
                          in mount/locate latency.
                          (Other values may be used for this factor.)
```

Next, the leader file size thereby estimated by step 52 is rounded up so that it is an integral number of disk blocks, shown at step 54. This step may be more precisely shown also with the following pseudo code example:

```
Leader_File_Size  =  (Raw_Leader_File_Size modulus
                      Disk_Block_Size) +
                      Raw_Leader_File_Size;
Where:
Leader_File_Size  =  size of leader file that will
                      reside on disk.
```

Next, the video data associated with the particular user selection is imported to tape as two files, shown at step 56. More specifically, the video data is broken up into the previously described leader file and the remainder file. It will be noted that it is not critical to the invention to break the file at an I-Frame boundary (or, for that matter, at any boundary specific to the video data compression method that is being used) since the remainder of the file will be appended prior to the user viewing this section of the file. The leader file in the embodiment described preferably will fill an integral number of disk blocks, however. Breaking the video data into the aforementioned two files allows for the remainder of the video data file to be located more quickly. Again, however, this is not an absolute requirement of the invention to break the file up.

Finally, with respect to the initial import/preparation stage, the leader file thereby created will be imported to disk storage 24, shown at step 58. The catalog entry in the catalog 30 of the video server 16 for the particular video file which is desired to be viewed will indicate that the file is not complete and that the remainder of the file resides on tape.

Next, the stage of the invention commences in which actual viewing of the video selection is facilitated, shown as phase 60 in FIG. 5A. In accordance with the steps associated with this phase, first the user will be assumed to have requested a video selection, shown at step 62, via an application server 12 interfaced to the video server control server component 14. This control server 14 will then determine that the desired video data is stored partially on disk, with the remainder on tape, shown at step 64 in FIG. 5A. In response to this determination, the control server 14 will issue a reservation request on line 32A to the video archive server 16 for the particular video selection, shown at step 66. The video control server 14 will issue a reservation request to the video server file system or "data pump" 22, for viewing bandwidth plus bandwidth required to move the remainder file from disk to tape.

Continuing with FIG. 5A, next in the viewing stage 60, the video archive server 16 will determine status of its request queue 20, shown at step 68. It will be noted that this Video Archive Request Queue is in the embodiment described, a logical first-in-first-out (FIFO) queue of requests for access to data stored on the tape cartridges of the tape library 18. Each entry in the queue contains the file size of the requested file and the cartridge on which the file is stored. The delay time to which the request can be serviced is calculated based upon the estimated residence time of each request (e.g., the time required to retrieve the requested file of given size) and the time required to mount the cartridge and locate the data on tape. The current request is entered into the archive request queue 20 and the delay time parameter is returned to the control server 14 on line 32A.

Next the control server 14 will compare the delay time value returned from the video archive server 16 with the play time of the leader file (i.e., the time that the leader file will play at the desired viewing bit rate). This play time of the leader file has hereinafter been referred to as the "drop_dead_time". This comparison step is shown as step 70 in FIG. 5B.

Continuing with the viewing phase and the description of FIG. 5B, if the delay_time is greater than the drop_dead_time as a result of the comparison at step 70, then the selection cannot be played immediately and the process exits to the right of block 70. If this occurs, the user is notified that the selection cannot be played, 72, along with an estimated time as to when the video may be viewed, 74. If the viewing request is cancelled, the request to the video archive server may be cancelled. The function then returns to the calling process, 76.

If, as a result of the comparison at block 70, the delay time is not determined to be greater than the drop_dead_time, then the process will begin to service the viewing request for the video from the leader file, shown at step 76. The pending request from the video archive server 16 is serviced while the leader file data is being viewed, 78. The remaining file data is appended to the leader file, 80. (Alternatively, the remaining data may be stored on disk as a separate file and then added using the playlist option previously described). There is preferably in the implementation described, additional tolerance built into the system since it is not necessary for the remaining data to be completely transferred from tape to disk before the data in the leader file is exhausted. The rate at which data is transferred from tape may exceed the viewing rate by a factor of approximately 8:1 in a practical implementation.

The process thereafter will enter a post viewing process 86. At this time, following the viewing of the video selection that was obtained from tape, the remaining data is preferably removed from disk after some period of time by truncating the file (e.g., FTRUNC( )) to the original leader file size. This step is shown at block 82, thereby completing the process, whereupon a return 84 occurs.

Figure 6A:
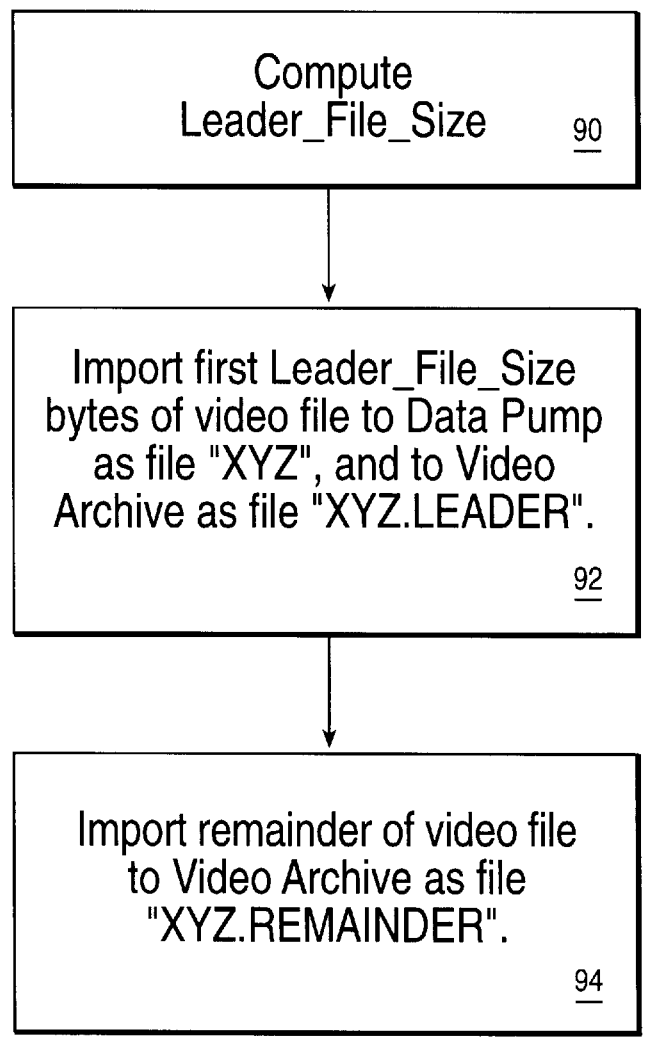
FIGS. 6A, 6B, and 6C are flow diagrams similar to those of FIGS. 5A–5B with alternate features and additional detail.
Figure 6B:
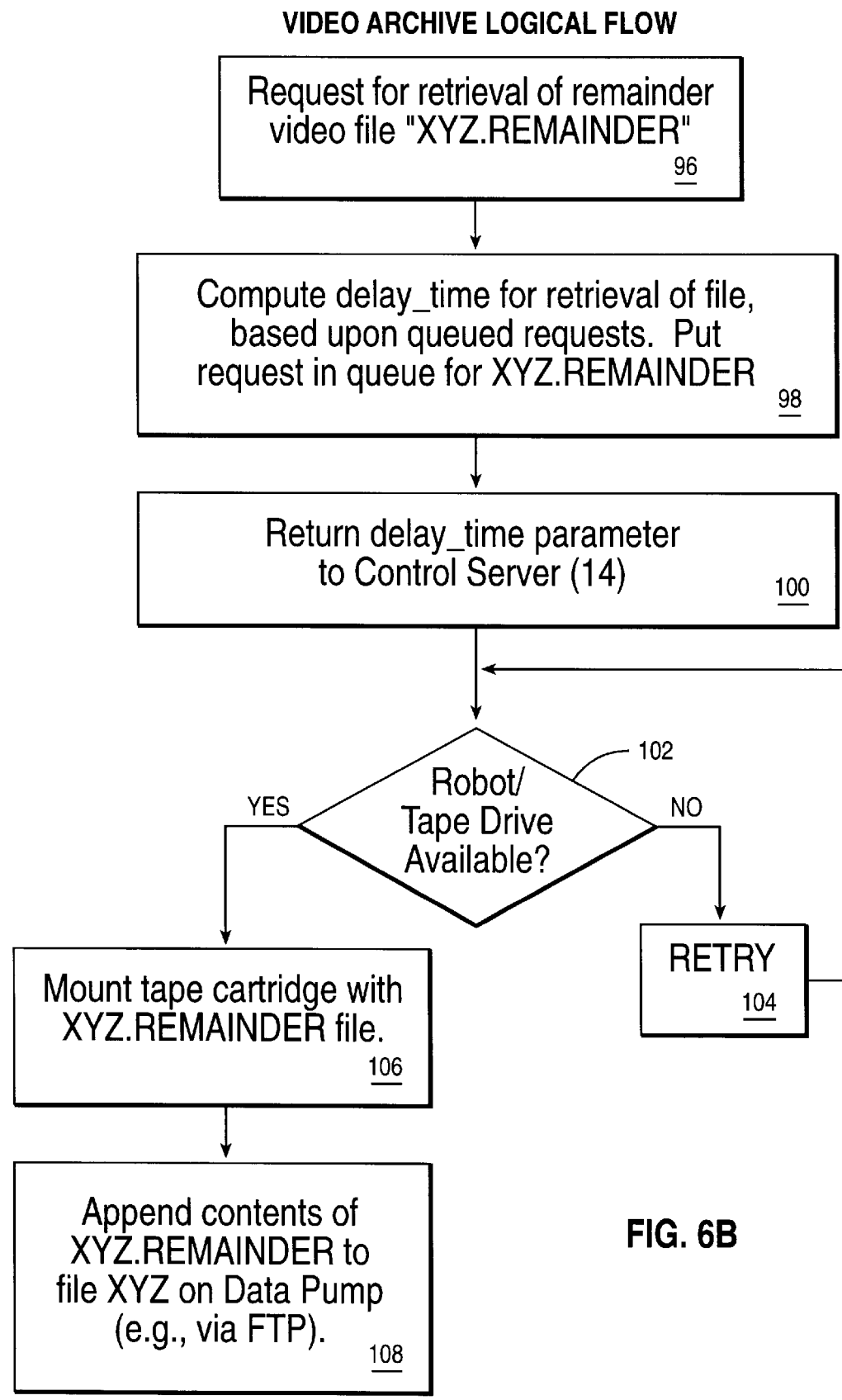
Figure 6C:
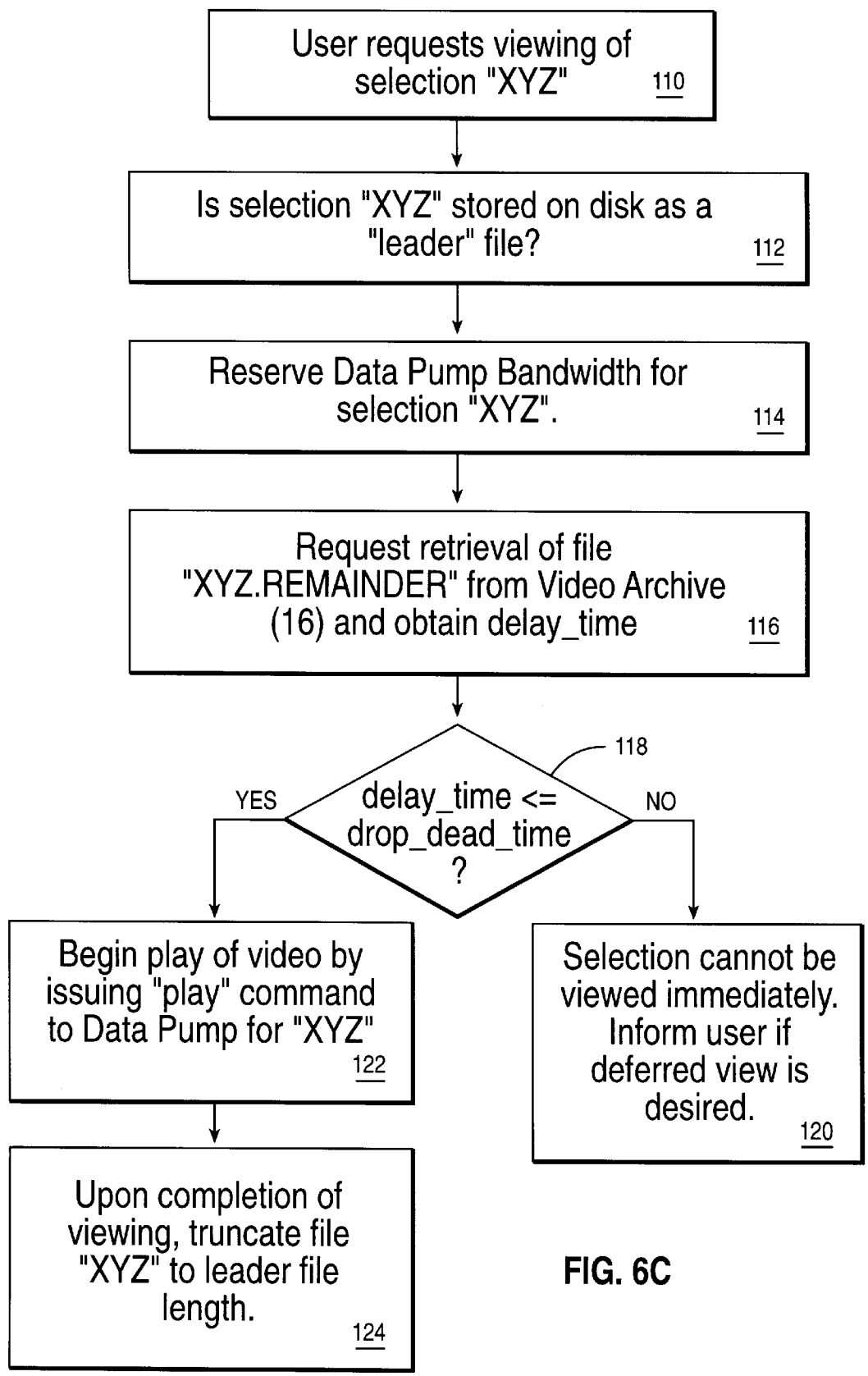

Turning to FIGS. 6A–6C, FIG. 6A provides in greater the steps in the initial import and preparation of data. The leader size is first computed, 90, followed by importing the leader bytes to the data pump and to the video archive, 92. Remainder of the video file is then imported to the video archive, 94.

Turning to FIG. 6B, the video archive logical flow is shown in greater detail. First a request to retrieve the remainder is received, 96. The delay_time is computed and the request placed in the queue, 98. The delay_time parameter is returned to the control server 14 shown at reference numeral 100. The system then queries whether a robot/tape drive is available, 102. If not, the system retries until successful or timing out, 104. If the robot/tape drive is available, the tape cartridge with the remainder is mounted, 106, and the contents of the remainder appended to the data pump, 108.

Turning now to FIG. 6C, more detail is provided regarding the control server logical flow. The user requests a view of the selection "XYZ", 110. The system then queries whether the selection is stored on disk with a leader file, 112. Data pump bandwidth is then reserved for the selection, 114. Retrieval of the remainder from the video archive and the calculated delay_time then occurs, 116. If the drop_dead_time is greater than the delay time, determined at 118, the selection cannot be viewed immediately and the user is informed if deferred view is desired, 120. If delay time is calculated at block 118 at being less than the drop_dead_time, the video play commences by issuing a play command to the data pump for the XYZ file, 122. Finally, upon completion of viewing, the XYZ is file truncated to the leader length, 124.

While the invention has been shown and described with reference to particular embodiments thereof, it will be understood by those skilled in the art that the foregoing and other changes in form and detail may be made therein without departing from the spirit and scope of the invention.

We claim:

1. A method for use in a computer system to serve a file having a leader and a remainder in response to a request, comprising:

prestoring said leader prior to said request in a first playback system;

playing back said prestored leader in response to said request;

queuing said remainder in response to and during said playing of said leader in response to a command;

transferring said queued remainder to said first playback system from a second playback system having a latency greater than said first play system; and playing back said queued remainder in response to said playing back of said leader.

2. The method of claim 1 wherein said first playback subsystem is a digital disk array.

3. The method of claim 2 wherein said second playback subsystem is selected from a group comprising:

a magnetic tape archive, an optical disk archive, a digital video disk archive, or a DLT archive.

4. The method of claim 3 wherein said second playback subsystem is said magnetic tape archive.

5. The method of claim 1 wherein said file is a video file.

6. The method of claim 1 wherein said file is an audio file.

7. The method of claim 5 wherein said playing back of said queued remainder commences contiguously at completion of said playing back said leader.

8. The method of claim 1 wherein said playing back said leader is at a first rate;

said transferring said remainder comprises:

reading said remainder from said second playback system; and transmitting said read remainder to said first playback system at a second rate faster than first rate; and wherein said playing back said queued remainder is from said first playback system at said first rate.

9. The method of claim 8 wherein said leader and said remainder are stored as one file prior to said playing back said leader.

10. The method of claim 8 wherein said leader and said remainder are stored as separate files prior to said playing back of said leader.

11. The method of claim 10 wherein said method further includes:

generating a playlist correlating a plurality of said leaders and corresponding ones of said remainders.

12. The method of claim 11 wherein said queuing said remainder includes:

searching said playlist for an entry corresponding to said leader; and queuing said remainder from a said corresponding ones of said remainders listed in said playlist in response to said searching.

13. The method of claim 12 including:

determining a delay time corresponding to said second latency and functionally related to when a request for said remainder can be serviced from said second playback system;

determining a playtime for said leader; and comparing said delay time and said play time.

14. The method of claim 13 wherein said delay time includes:

a time to mount a tape cartridge of said second playback subsystem containing said remainder and locate said remainder on said cartridge.

15. The method of claim 13 including:

in response to said comparing indicating said delay time is greater than said play time, generating a notice that said file cannot be viewed;

calculating an estimated time when said file can be viewed; and generating a notice of said estimated time.

16. The method of claim 13 wherein said play time comprises the time for said playing back of said leader at a preselected bit rate.

17. The method of claim 13 including:

in response to said comparing indicating said delay time is substantially equal to or less than said play time, commencing said playing back of said leader.

18. The method of claim 17 wherein, in response to said comparing indicating said delay time is substantially equal to or less than said play time, said method further includes the step of:

queuing said remainder in response to said comparing.

19. The method claim 18 including:

adding said remainder to said leader in response to said searching said playlist.

20. The method of claim 1 wherein said leader is stored on a disk; said queuing said remainder includes storing said remainder on said disk; and said method includes removing said remainder from said disk after said playing back said queued remainder.

21. A method for serving a file having a leader and remainder in a digital computer system comprising:

estimating said leader;

importing said file into said system as a leader file and remainder file, said remainder file being imported to a second storage having a second latency, and said leader file being imported to a first storage having a first latency less than said second latency;

receiving a request to retrieve said file;

determining that said file is stored on said first and said second storage;

generating a reservation request to said second storage for said remainder file;

determining a play time and delay time;

comparing said play time and delay time; and in response to said comparing, playing said leader if said delay time is substantially equal to or less than said play time; and rejecting said playing if said delay time is greater than said play time.

22. Apparatus for serving files each having a leader and remainder in a digital computer system comprising:

control server means for cataloging said files;

tape library means for storing and playing back at a second latency a plurality of said remainders each corresponding to a different one said file;

video server file system means including:

disk array means for storing and playing back at a first latency a plurality of said leaders each corresponding to a different one of said remainders; and data pump means for receiving a said leader and a corresponding said remainder and transmitting seamlessly said leader and said remainder; and video archive server means for retrieving selected ones of said remainders from said tape library means and transmitting said selected ones of said remainders for storage and playback by said disk array means.

23. Apparatus for use in a computer system to serve a file having a leader and a remainder in response to a request, comprising:

means for prestoring said leader prior to said request in a first playback system;

means for playing back said prestored leader in response to said request;

means for queuing said remainder in response to and during said playing of said leader;

means for transferring in response to a command, said queued remainder to said first playback system from a second playback system having a latency greater than said first playback system; and means for playing back said queued remainder in response to said playing back of said leader.

24. The apparatus of claim 23 wherein said first playback subsystem is a digital disk array.

25. The apparatus of claim 24 wherein said second playback subsystem is selected from a group comprising:

a magnetic tape archive, an optical disk archive, a digital video disk archive, or a DLT archive.

26. The apparatus of claim 25 wherein said second playback subsystem is said magnetic tape archive.

27. The apparatus of claim 23 wherein said file is a video file.

28. The apparatus of claim 23 wherein said file is an audio file.

29. The apparatus of claim 27 wherein said playing back of said queued remainder commences contiguously at completion of said playing back said leader.

30. The apparatus of claim 23 wherein said playing back said leader is at a first rate;

said means for transferring said remainder comprises:

means for reading said remainder from said second playback system; and means for transmitting said read remainder to said first playback system at a second rate faster than first rate; and wherein said means for playing back said queued remainder is from said first playback system at said first rate.

31. The apparatus of claim 30 wherein said leader and said remainder are stored as one file prior to said means for playing back said leader.

32. The apparatus of claim 30 wherein said leader and said remainder are stored as separate files prior to said means for playing back of said leader.

33. The apparatus of claim 32 wherein said apparatus further includes:

means for generating a playlist correlating said a plurality of leaders and corresponding ones of said remainders.

34. The apparatus of claim 33 wherein said means for queuing said remainder includes:

means for searching said playlist for an entry corresponding to said leader; and means for queuing said remainder from said corresponding ones of said remainders listed in said playlist in response to said searching.

35. The apparatus of claim 34 including:

means for determining a delay time corresponding to said second latency and functionally related to when a request for said remainder can be serviced from said second playback system;

means for determining a playtime for said leader; and means for comparing said delay time and said play time.

36. The apparatus of claim 35 wherein said delay time includes:

a time to mount a tape cartridge of said second playback subsystem containing said remainder and locate said remainder on said cartridge.

37. The apparatus of claim 35 including in response to said comparing indicating said delay time is greater than said play time, means for generating a notice that said file cannot be viewed;

means for calculating an estimated time when said file can be viewed; and means for generating a notice of said estimated time, said means for generating said notice that said file cannot be viewed, said means for calculating said estimated time, and said means for generating said notice of said estimated time being responsive to said comparing indicating said delay time is greater than said play time.

38. The apparatus of claim 35 wherein said play time comprises the time for said means for playing back of said leader at a preselected bit rate to execute said playing back.

39. The apparatus of claim 35 including:

means for commencing said playing back of said leader responsive to said means for comparing indicating said delay time is substantially equal to or less than said play time.

40. The apparatus of claim 39 wherein said apparatus further includes:

means for queuing said remainder in response to said means for comparing means indicating said delay time is substantially equal to or less than said play time.

41. The apparatus of claim 40 including:

means for adding said remainder to said leader in response to said searching said playlist.

42. The apparatus of claim 23 wherein said leader is stored on a disk; said means for queuing said remainder includes storing said remainder on said disk; and said apparatus includes means for removing said remainder from said disk after said playing back said queued remainder.

* * * * *